United States Patent
Noh et al.

(10) Patent No.: US 9,621,930 B2
(45) Date of Patent: Apr. 11, 2017

(54) DISTRIBUTED TRANSCODING OF VIDEO FRAMES FOR TRANSMISSION IN A COMMUNICATION NETWORK

(75) Inventors: Jeonghun Noh, Palo Alto, CA (US); Minar Makar, Stanford, CA (US); Bernd Girod, Stanford, CA (US); Frank Hartung, Herzogenrath (DE); Jatinder Pal Singh, Mountain View, CA (US)

(73) Assignees: DEUTSCHE TELEKOM AG, Bonn (DE); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 1376 days.

(21) Appl. No.: 13/072,885

(22) Filed: Mar. 28, 2011

(65) Prior Publication Data

US 2011/0274155 A1 Nov. 10, 2011

Related U.S. Application Data

(60) Provisional application No. 61/332,634, filed on May 7, 2010.

(51) Int. Cl.
*H04N 7/12* (2006.01)
*H04N 21/2343* (2011.01)
(Continued)

(52) U.S. Cl.
CPC ..... *H04N 21/23439* (2013.01); *H04N 19/103* (2014.11); *H04N 19/164* (2014.11);
(Continued)

(58) Field of Classification Search
CPC .. H04N 19/103; H04N 19/164; H04N 19/177; H04N 19/40; H04N 19/587; H04N 21/23439; H04N 21/632
(Continued)

(56) References Cited

U.S. PATENT DOCUMENTS

| 2002/0116715 | A1* | 8/2002 | Apostolopoulos | 725/86 |
| 2005/0226325 | A1* | 10/2005 | Dei et al. | 375/240.12 |

(Continued)

OTHER PUBLICATIONS

Arvind et al. Audio Streaming Using Interleaved Forward Error Correction Department of Computer Science and Engineering SRI Venkateswara College of Engineering Pennalur 602105 Mar. 2003.*

(Continued)

*Primary Examiner* — Gims Philippe
*Assistant Examiner* — Joseph Becker
(74) *Attorney, Agent, or Firm* — Leydig, Voit & Mayer, Ltd.

(57) ABSTRACT

A method is described for streaming video data within a network, wherein the video data includes a sequence of frames. The method includes encoding the sequence of frames and generating a plurality of substreams from the encoded frames in this embodiment. Each of the plurality of substreams is assigned an identifier, and each substream includes a common encoded frame and a non-overlapping portion of the encoded sequence. The non-overlapping portion of the encoded sequence of each substream is selected from the encoded frames based on the identifier of the respective substream. The method also includes transmitting the plurality of substreams to a receiver in an embodiment.

13 Claims, 12 Drawing Sheets

(51) Int. Cl.
- H04N 21/63 (2011.01)
- H04N 19/103 (2014.01)
- H04N 19/164 (2014.01)
- H04N 19/177 (2014.01)
- H04N 19/587 (2014.01)
- H04N 19/40 (2014.01)

(52) U.S. Cl.
CPC .......... *H04N 19/177* (2014.11); *H04N 19/40* (2014.11); *H04N 19/587* (2014.11); *H04N 21/632* (2013.01)

(58) Field of Classification Search
USPC .......... 348/607; 375/240.27, 240.12, 240.01
See application file for complete search history.

(56) References Cited

U.S. PATENT DOCUMENTS

| | | | | |
|---|---|---|---|---|
| 2007/0121722 A1* | 5/2007 | Martinian et al. | ....... | 375/240.12 |
| 2008/0316362 A1* | 12/2008 | Qiu et al. | ....... | 348/607 |
| 2010/0095184 A1* | 4/2010 | Zuckerman et al. | ....... | 714/751 |

OTHER PUBLICATIONS

Dong et al. A multiple description speech coder based on AMR-WB for mobile ad hoc networks This paper appears in:Acoustics, Speech, and Signal Processing, 2004. Proceedings. (ICASSP '04). IEEE International Conference onDate of Conference: May 17-21, 2004 vol. 1 pp. I—277-280.*

Ke et al. Improving video transmission on the Internet This paper appears in:Potentials, IEEEDate of Publication: Jan.-Feb. 2007 Author(s): Chih-Heng Ke Dept. of Electr. Eng., Nat. Cheng Kung Univ., Tainan; Ce-Kuen Shieh; Wen-Shyang Hwang; Ziviani, A. vol. 26 , Issue: 1 pp. 16-19.*

A. Warabino, S. Ota, D. Morikawa, M. Ohashi, "Video transcoding proxy for 3G wireless mobile Internet access," Communications Magazine, pp. 66-71, Jan. 2000.

S. Dogan, A. Cellatoglu, M. Uyguroglu, A. Sadka, A. Kondoz, "Error-resilient video transcoding for robust internetworkcommunications using GPRS," IEEE Transactions on Circuits and systems for video technology, vol. 12, No. 6, pp. 453-464, 2002.

A. Vetro, C. Christopoulos, H. Sun, "Video transcoding architectures and techniques: an overview," IEEE Signal Processing Magazine, vol. 20, No. 2, pp. 18-29, 2003.

M. Castro, P. Druschel, A.-M. Kermarrec, A. Nandi, A. Rowstron, A. Singh, "Split-Stream: High-bandwidth content distribution in a cooperative environments," Proc. of IPTPS'03, Berkeley, CA, pp. 1-6, Feb. 2003.

V. N. Padmanabhan, H. J.Wang, P. A. Chou, K. Sripanidkulchai, "Distributing streaming media content using cooperative networking," Proc. of ACM NOSSDAV, Miami Beach, FL, pp. 177-186, May 2002.

E. Setton, J. Noh, B. Girod, "Rate-Distortion Optimized Video Peer-to-Peer Multi-cast Streaming," Workshop on Advances in Peer-to-Peer Multimedia Streaming at ACM Multimedia, Singapore, pp. 39-48, Nov. 2005.

S. Venot, L. Yan. "On-demand mobile peer-to-peer streaming over the JXTA overlay," Mobile Ubiquitous Computing, Systems, Services and Technologies, (UBICOMM), pp. 131-136, Nov. 2007.

F. Chen, T. Repantis, V. Kalogeraki, "Coordinated media streaming and transcoding in peer-to-peer systems," in 19th IEEE International Parallel and Distributed Processing Symposium, pp. 1-10, 2005. Proceedings, 2005.

J. Apostolopoulos, T. Wong, W. Tan, S. Wee, "On multiple description streaming with content delivery networks," in IEEE INFOCOM 2002, pp. 1-10, Proceedings, vol. 3, 2002.

A. Dutta, J. Chennikara, W. Chen, O. Altintas, H. Schulzrinne, "Multicasting streaming media to mobile users," IEEE Communications Magazine, vol. 41, No. 10, pp. 2-10, 2003.

M. Leung, S. Chan, "Broadcast-based peer-to-peer collaborative video streaming among mobiles," IEEE Transactions on Broadcastihg, vol. 53, pp. 350-361, 2007.

A. Konrad, A. Joseph, R. Ludwig, B. Zhao, "A Markov-based channel model algorithm for wireless networks," Wireless Networks, vol. 9, No. 3, pp. 1-11, 2003.

Y. Cui. B. Li., K. Nahrstedt. "oStream: Asynchronous streaming multicast in application-layer overlay networks," IEEE J. Sel. Areas Commun., vol. 22. No. 1, pp. 1-13, 2004.

Y. Guo, K. Suh, J. Kurose., D. Towsley, "P2Cast: peer-to-peer patching scheme for VoD service," Proceedings of the 12th international conference on World Wide Web, pp. 301-309, May 2003.

T. Do., K. A. Hua, M. Tantaoui. "P2VoD: providing fault tolerant video-on-demand streaming in peer-to-peer environment," Proc. of IEEE International Conference on Communications (ICC), vol. 3, pp. 1-18. Jun. 2004.

E. Setton, J. Noh, B. Girod, "Low-Latency video streaming over peer-to-peer networks," Proceedings International Conference on Multimedia and Expo (ICME), Toronto, Canada, pp. 569-572. Jul. 2006.

C. Huang, J. Li, K. Ross. "Peer-Assisted VoD: Making Internet video distribution cheap," Proc. of IPTPS '07, pp. 1-6, Feb. 2007.

P. Baccichet. J. Noh, E. Setton, B. Girod, "Content-aware P2P video streaming with low latency," IEEE Int. Conference on Multimedia and Expo, ICME: Beijing, China, pp. 400-403, Jul. 2007.

A. Mavlankar, J. Noh, P. Baccichet, B. Girod. "Peer-to-peer multicast live video streaming with interactive virtual pan/tilt/worn functionality," Proc. of International Conference on Image Processing (ICIP), San Diego, USA, pp. 2296-2299, Oct. 2008.

H. Schwarz, D. Marple, T. Wiegand, "Overview of the scalable video coding extension of the H.264/AVC standard," IEEE Trans. Circuits Syst. Video Technol., vol. 13, No. 7, pp. 1-18., Sep. 2007.

T. Wiegand, G. Sullivan, G. Bjontegaard, A. Luthra, "Overview of the H264/AVC video coding standard," IEEE Trans. Circuits Syst. Video Technol., vol. 13, No. 7, pp. 560-576, Jul. 2003.

\* cited by examiner

DISTRIBUTED TRANSCODING OF VIDEO FRAMES FOR TRANSMISSION IN A COMMUNICATION NETWORK

CROSS-REFERENCE TO RELATED APPLICATION

This application claims priority to U.S. Provisional Application No. 61/332,634, filed May 7, 2010, which is hereby incorporated by reference in its entirety and for everything it describes therein.

TECHNICAL FIELD

The present invention is related in general to video coding and in particular, but not exclusively, to an apparatus, method, and system for distributing video transcoding in a communication network.

BACKGROUND OF THE INVENTION

Live streaming to network devices, such as portable computer, cellular phones, and Personal Digital Assistants (PDAs), is a challenging task especially due to their heterogeneity. That is, the network devices differ in display size, main memory, processor, media capability, and network access technology. In typical streaming systems, live media adaptation is performed to meet the requirements of heterogeneous mobile terminals. For video, media adaptation is often achieved by video transcoding. Video transcoding converts an original video bitstream to a new bitstream for a different encoding standard, smaller spatial resolution, reduced frame rate, or reduced quality (due to coarser quantization). However, transcoding poses a considerable computational burden on the streaming server because mobile devices often require individually customized transcoding.

Traditionally, video transcoding for a mobile device has been performed at a single media server. When the server is over-loaded with concurrent transcoding/streaming tasks, clients may experience interruption in receiving video. Since the server is a single point of service to provide the streaming service, one must provide redundancy to the system to avoid server overload in order to offer incessant streaming to the clients.

Video support of mobile devices such as cellular phones has been expensive due to its computational complexity caused by transcoding the video data for each mobile user. Peer-to-Peer (P2P) systems have been considered to be more cost-effective than server-client based systems. One major weakness of the P2P systems, however, is that the streaming service is easily disrupted due to unexpected peer churn, that is, the dynamics created by the peers joining or leaving the network system. When peers leave the system without prior notice, other peers connected to the departing peers may experience temporary service disruption and/or disconnection.

SUMMARY

In an embodiment, the present disclosure provides a method for streaming video data within a network, wherein the video data includes a sequence of frames. The method includes encoding the sequence of frames and generating a plurality of substreams from the encoded frames in this embodiment. Each of the plurality of substreams is assigned an identifier, and each substream includes a common encoded frame and a non-overlapping portion of the encoded sequence. The non-overlapping portion of the encoded sequence of each substream is selected from the encoded frames based on the identifier of the respective substream. The method also includes transmitting the plurality of substreams to a receiver in an embodiment.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, in which.

DETAILED DESCRIPTION OF THE INVENTION

Figure 1:
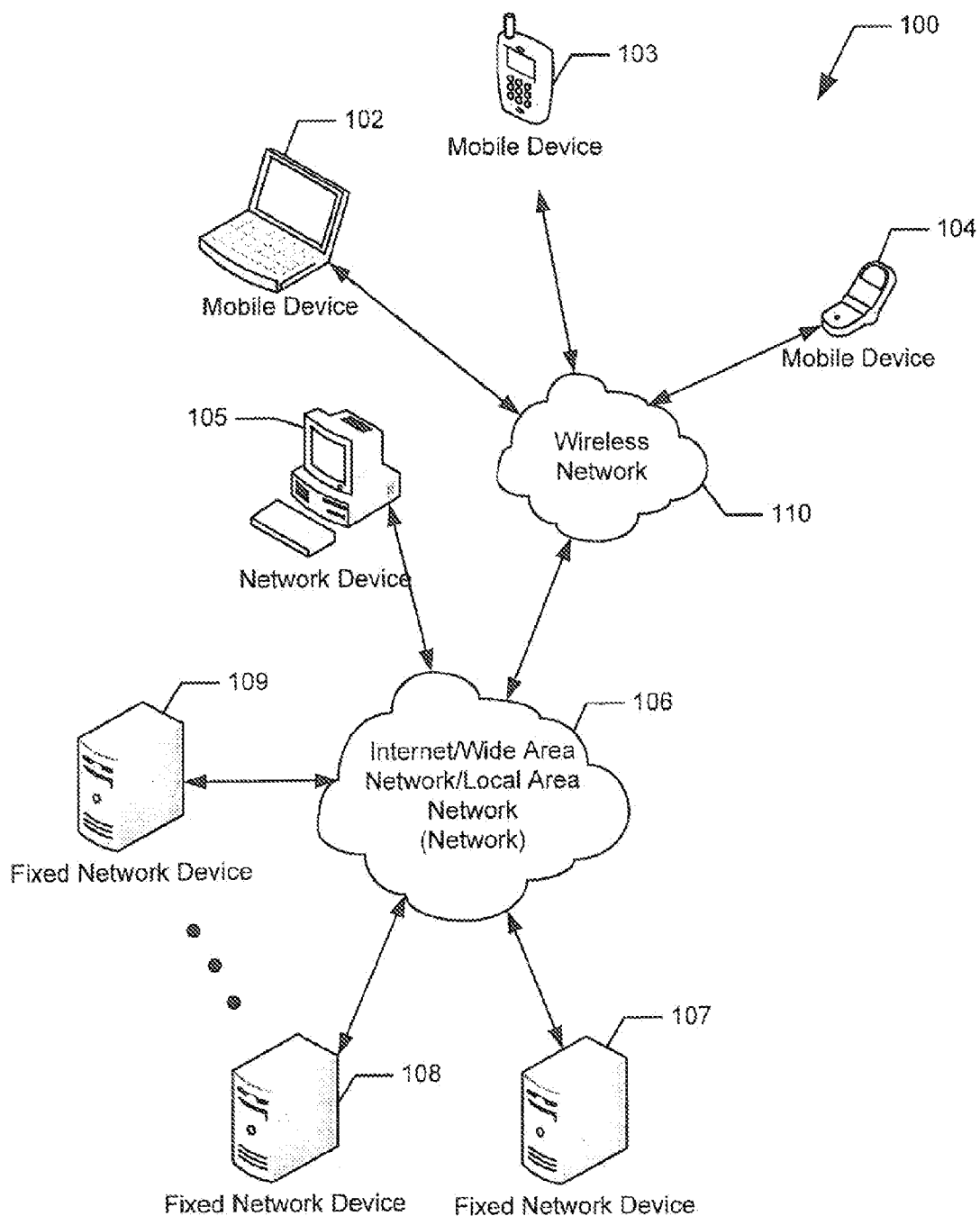
FIG. 1 depicts a network system according to one embodiment of the invention for distributing encoded video data.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, a method, apparatus, and system for streaming data over a communication network are provided. The method provides a cost-effective solution to minimize or eliminate the service disruption caused by peer churn in streaming data to mobile devices in a P2P system. The mobile devices includes, but not limited to, portable computers, cell phones, PDAs, and smart phones. The method includes generating a plurality of coded data streams from an original data stream including a frame sequence, where each coded stream is generated on a server by coding a subset of the original data stream. The plurality of coded data streams are then transmitted to a mobile device, where the coded data streams are assembled and decoded to provide a copy of the frame sequence. When data from one of the coded data streams becomes unavailable (i.e., missing or including defects), or when the entire coded data streams becomes unavailable, a copy of the data in at least one other coded streams is used in the place of the unavailable data to recover the frame sequence.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 include network 106, wireless network 110, mobile devices 102-104, fixed network devices 105 and 107-109.

In general, system 100 has a Peer-to-Peer (P2P) distributed network structure including network nodes (devices) that make a portion of their resources, such as processing power, network bandwidth, or data stored thereon, directly available to other network nodes, without the need for central coordination instances, such as servers or stable hosts. A network node, such as mobile devices 102-104 or fixed network devices 105 or 107-109, can directly request and receive data from a plurality of other participants and assemble them to recover the information. For example, mobile device 102 can request video data be sent from fixed network devices 107-109 in parallel and assemble them to form a single video stream, which is then played back on the screen of the mobile device 102. Because the system 100 is organized in a P2P structure, there is no server-client relationship among the devices 102-105 and 107-109. Each device can potentially contribute to data available within the system 100.

Generally, mobile devices 102-104 may include virtually any mobile computing device capable of receiving data over a network, such as wireless network 110, or the like. Such devices include portable devices such as, cellular telephones, smart phones, radio frequency (RF) devices, infrared devices, Personal Digital Assistants (PDAs), handheld computers, laptop computers, wearable computers, tablet computers, integrated devices combining one or more of the preceding devices, or the like.

Network device 105 may include virtually any computing device that typically connects using a wired communications medium such as personal computers, multiprocessor systems, microprocessor-based or programmable consumer electronics, network PCs, or the like.

Devices that may operate as network devices 107-109 include personal computers desktop computers, multiprocessor systems, microprocessor-based or programmable consumer electronics, network PCs, servers, and the like.

In general, the fixed network devices 107-109 have higher processing power and larger disk storage and bandwidth, and, therefore, are configured to receive as well as supply resources or data to other participants in system 100. Some of the fixed network devices, on the other hand, such as device 105, have very limited processing power or storage space. Therefore, devices such as 105 are configured as consumers of data, meaning that they only receive data provided by other participants, but do not provide data to other network nodes. Similarly, most mobile devices 102-104 are generally configured as data consumer, which only receive but do not supply data, because of their limited processing power, bandwidth, and storage space.

Server device 107 may further provide a variety of services that include, but are not limited to web services, third-party services, audio services, video services, email services, IM services, SMS services, VOIP services, calendaring services, photo services, or the like. Content may include web content, audio content, video content, FTP data, or the like.

Wireless network 110 is configured to couple mobile devices 102-104 with network 105. Wireless network 110 may include any of a variety of wireless sub-networks that may further overlay stand-alone ad-hoc networks, or the like, to provide a connection for mobile devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between mobile devices 102-104 and another computing device, network, or the like.

Network 105 is configured to couple network devices 105 and 107-109 with other computing devices, including through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network includes any communication method by which information may travel between computing devices.

Illustrative Mobile Devices 102-104 and Network Device 105

Figure 2:
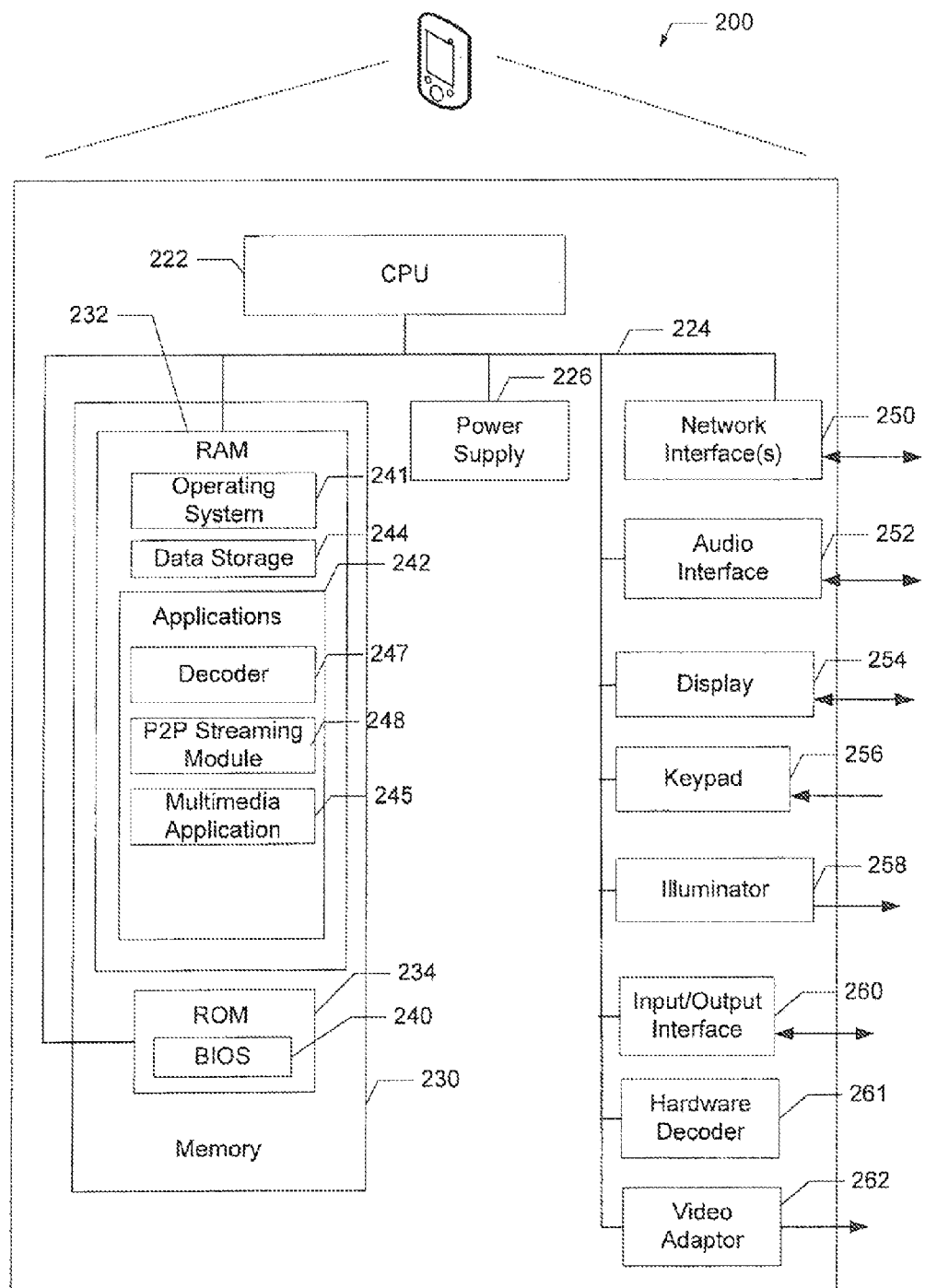
FIG. 2 depicts a schematic diagram of the mobile device shown in FIG. 1.

FIG. 2 shows one embodiment of device 200 that may be included in system 100 implementing the invention. Device 200 may include many more or less components than those shown in FIG. 2. However, the components shown are sufficient to implement an illustrative embodiment for practicing the present invention. Device 200 may represent, for example, one embodiment of at least one of mobile devices 102-104 and network device 105 of FIG. 1.

As shown in the figure, device 200 includes a processing unit (CPU) 222 in communication with a mass memory 230 via a bus 224. Device 200 also includes a power supply 226, one or more network interfaces 250, an audio interface 252, a display 254, a keypad 256, an illuminator 258, and an input/output interface 260. Power supply 226 provides power to device 200. A rechargeable or non-rechargeable battery may be used to provide power. The power may also be provided by an external power source, such as an AC adapter or a powered docking cradle that supplements and/or recharges a battery.

Device 200 can communicate with another computing device directly or indirectly via network interface 250. Network interface 250 includes circuitry for coupling device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

In addition, device 200 may further include video adaptor 262, which is configured to provide video signals to an external display.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the device is powered. In addition, illuminator 258 may backlight these buttons in various patterns when particular actions are performed, such as dialing another device. Illuminator 258 may also cause light sources positioned within a transparent or translucent case of the device to illuminate in response to actions.

Device 200 also comprises input/output interface 260 for communicating with external devices, such as a headset. Input/output interface 260 can utilize one or more communication technologies, such as USB, infrared, Bluetooth™, or the like.

Device 200 typically ranges widely in terms of capabilities and features. For example, a cell phone 104 may have a numeric keypad and a few lines of monochrome LCD display on which only text may be displayed. In another example, a web-enabled mobile device such as a PDA 103 may have a touch sensitive screen, a stylus, and several lines of color LCD display in which both text and graphics may be displayed. In still another example, a multimedia-enabled mobile device such as laptop 102 may include a multimedia application 245 such as a video player application, which is configured to render images, videos streams, audio signals, or the like through a multimedia interface such as a color LCD or LED screen or a microphone. In still another example, device 200 may also include a browser application configured to receive and display graphics, text, multimedia, or the like, employing virtually any web-based language, including a wireless application protocol messages (WAP), or the like. For example, the browser application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), or the like, to display and send information.

As depicted in FIG. 2, in general, device 200 also includes a decoder. In one embodiment, the decoder is part of the multimedia application 245 described above or a standalone application 247 running in parallel with the multimedia application on the device. In another embodiment, the decoder is provided in a hardware module 261 as part of the hardware circuit in the device. The decoder is configured to decode multimedia data from the data stream received by the device and feed the decoded data to the multimedia application 245 such as the video player. Depending on the coding technique used in the encoded data stream, the decoder can perform loss or lossless decoding. The decoder may utilize proprietary decoding techniques or standardized decoding techniques defined in standard specifications such as H.261, H.264, JPEG, or MPEG.

Device 200 further include a P2P streaming module, which is configured to process the coded data stream received from other computing devices through network interface 250 in accordance with a P2P transmission scheme. The P2P streaming module can be part of the decoder 247 or 261 as described above or can be a standalone application 245, which operates in conjunction with the decoder. In one embodiment, the P2P streaming module operates on top of the Internet Protocol (IP) or other networking protocol as well known in the art. The P2P streaming module is further configured to provide information that identifies device 200, including a type, capability, name, or the like. In one embodiment, device 200 may uniquely identify themselves through any of a variety of mechanisms, including a phone number, Mobile Identification Number (MIN), an electronic serial number (ESN), mobile device identifier, network address, or other identifier.

In a further embodiment, the P2P streaming module 248 is configured to perform peer indexing and discovery. In particular, the P2P streaming module 248 may broadcast through network interface 250 a message, such as the "Hello" message, to each network devices in system 100. The message also identifies certain data, such as a digital video file, that device 200 requests from other devices in the system. Upon receiving responses, the P2P streaming module 248 identifies a number of network devices that has the requested data and assigns an identification (ID) to each of these network devices. In addition, the P2P streaming module 248 also conducts negotiations with other network devices to determine transmission rates, bandwidth, packet size, etc. For example, the P2P streaming module 248 may exam the responses received from the network devices that have the requested data, and select a predetermined number of network devices according to the uplink data rate or bandwidth offered by these network devices.

In addition, P2P streaming module 248 can further provide data assembling, retransmission request, and error correction. For example, P2P streaming module 248 can generate a copy of the requested data by assembling the data streams received from a plurality of computing devices in system 100. Upon discovering that one or more portions of the data are missing or contain errors, P2P streaming module 248 can request retransmissions of the unavailable data and/or correct the errors by applying an error correction method to the received data.

The operations of the P2P streaming module 248 and the decoder are further described hereinafter.

Illustrative Network Devices 107-109

Figure 3:
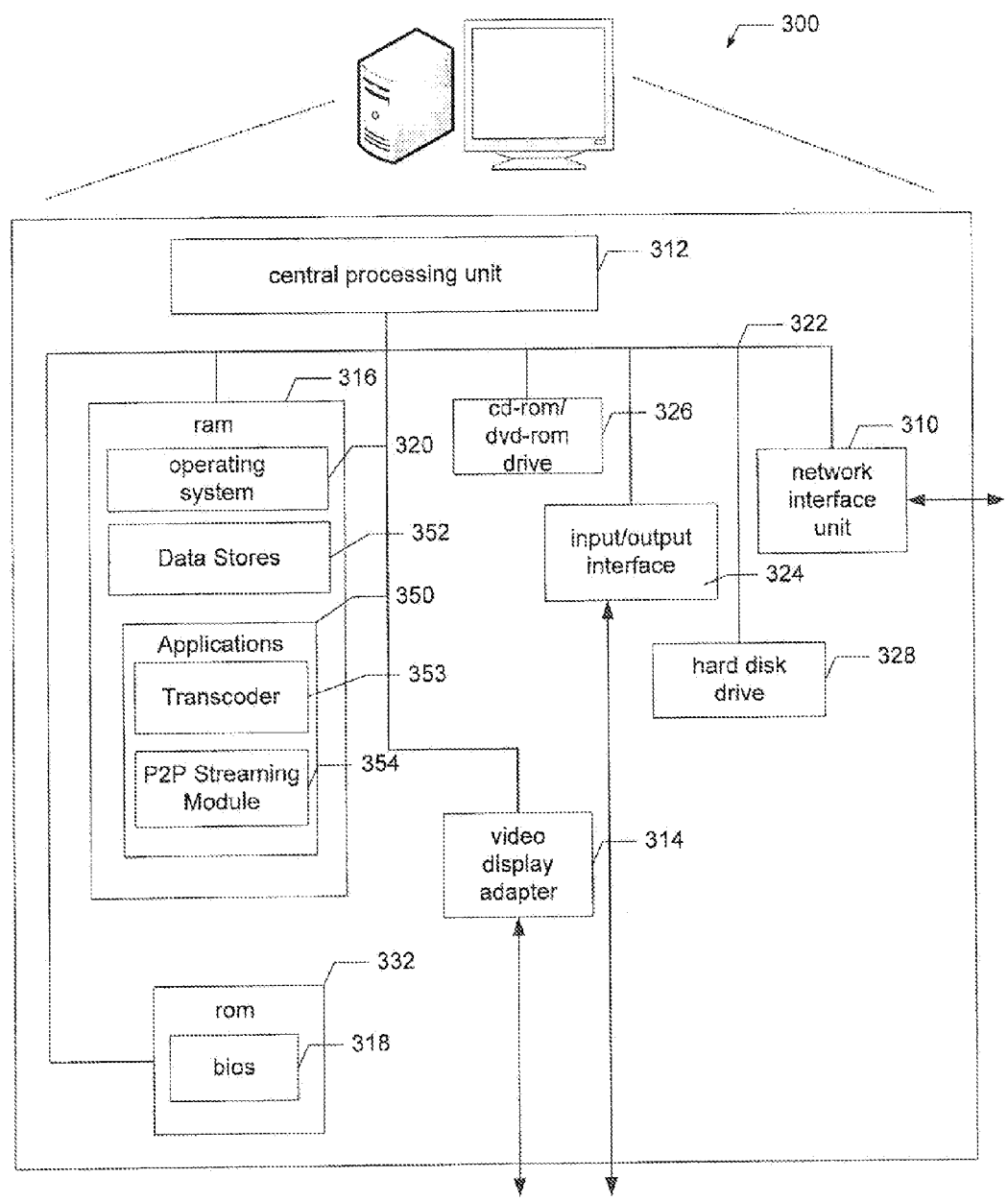
FIG. 3 depicts a schematic diagram of the fixed network device shown in FIG. 1.

FIG. 3 shows one embodiment of network devices 300. Network device 300 may include many more or less components than those shown. The components shown, however, are sufficient to disclose an illustrative embodiment for practicing the invention. Network device 300 may represent, for example, network device 107-109 of FIG. 1 and/or network device 105 of FIG. 1.

Specifically, network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. As used herein, such computer-readable storage media refers to physical, tangible devices. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical devices which can be used to store the desired information and which can be accessed by a computing device.

RAM 316 may include one or more data stores, which can be utilized by network device 300 to store, among other things, applications 350 and/or other data. RAM 316 can also be used to store database information. The mass memory also stores program code and data. One or more applications 350 are loaded into mass memory and run on operating system 320 by central processing unit 312. Examples of application programs may include transcoder 353, P2P streaming module 354, schedulers, calendars, database programs, word processing programs, HTTP programs, customizable user interface programs, IPSec applications, encryption programs, security programs, SMS message servers, IM message servers, email servers, account managers, and so forth.

Similar to P2P streaming module 248, P2P streaming module 354 provides various functions required by the P2P transmission of data, including identification of device 300 and other computing devices within system 100, index and discovery, data assembling, error correction, etc.

The operations of transcoder 353 and P2P streaming module 354 will be further described hereinafter.

Generalized Operation of System 100

For easy of discussion, the operations of system 100 are described hereinafter in the context of streaming encoded digital video data. However, the invention is suitable for transmitting a wide range of digital data within a P2P network, such as audio data, image data, etc.

In video coding, a video frame can be compressed/encoded using different coding algorithms, which lead to different amount of data compression. These different algorithms for encoding video frames are called picture types or frame types. There are three major picture types used in different video coding algorithms, namely I, P and B-frame. They are different in the following characteristics:

I-frames are the least compressible but do not require other video frames to decode.

P-frames require data from at least one previous frame to decode and are more compressible than I-frames.

B-frames require at least one previous and one forward frames for decoding, but have the highest amount of data compression rate.

In a video frame sequence, an I-frame is followed by a series of P and/or B-frames, which are encoded based on predictions computed, directly or indirectly, from the I-frame. This sequence of video frames led by the I-frame is known as a Group of Pictures (GOP). In order to decode a GOP, the I-frame must become available before any subsequent frames can be decoded.

In one embodiment, the invention provides an interleaved distributed transcoding method for transcoding video data at multiple locations before the video data is provided to the data consumer through the P2P connections. The advantage is two folds: 1) Burden of transcoding is lowered at each location; and 2) transcoding failure of one or some locations does not trigger full video blockage.

In providing the transcoded video data through the P2P connections, multiple substreams sharing common I-frames, that is, the video substreams produced by transcoding share the first frame, which is an I-frame, of each GOP. This allows multiple substreams to be easily merged into a single video bitstream at a client as well as to achieve higher compression ratio. The method described herein provides lost frame concealment in a video bit stream. It enables a typical video player such as the H.264 player to work with the interleaved distributed transcoding without any hardware/software modification. Although the invention is described here based on the H.264/AVC coding technique, it can be readily modified for any other compression technique, such as the MPEG4, SVC, or any subsequent coding standards including H.265.

According to various embodiments shown in the drawings, a peer-to-peer (P2P) streaming method is implemented in system 100. In system 100, certain network devices such as devices 102-105 only consume media contents (e.g., videos, audios, pictures, etc.), but do not contribute their uplink bandwidth or local storage due to their limited resources. Mobile devices 102-104 and network device 105 in the system 100 are treated as leeches, i.e., peers that only receive data but do not relay the data to other peers. For these reasons, mobile devices 102-104 and network device 105 are treated as "mobile nodes," although they can be connected to network 106 through wired or wireless connections.

In contrast, devices 106-107 not only consume media contents (e.g., videos, audios, pictures, etc.), but also contribute their uplink bandwidth or local storage. For easy of discussion, network devices connected to the network over a wired/wireless connection and contribute their resources to the system are defined as "fixed nodes." In general, fixed nodes are assumed to be plugged into a permanent power supply so that transcoding and video transmission do not drain battery too early. By harnessing the processing power of the fixed nodes, system 100 can scale well as network devices 107-109 bring resources into the system.

In addition, regardless of the physical connections used to connect the devices to networks 106 and/or 110, when a device receives data stream from other devices in system 100, it is defined as a "child" of the device(s) which provides the data and/or resources. When a device provide its data and/or resources to other devices, it is defined as a "parent" of the devices which receiving its data and/or resources. Therefore, mobile nodes 102-105 are generally the children of other devices, whereas fixed nodes 107-109 can be children and parents at the same time.

Figure 10:
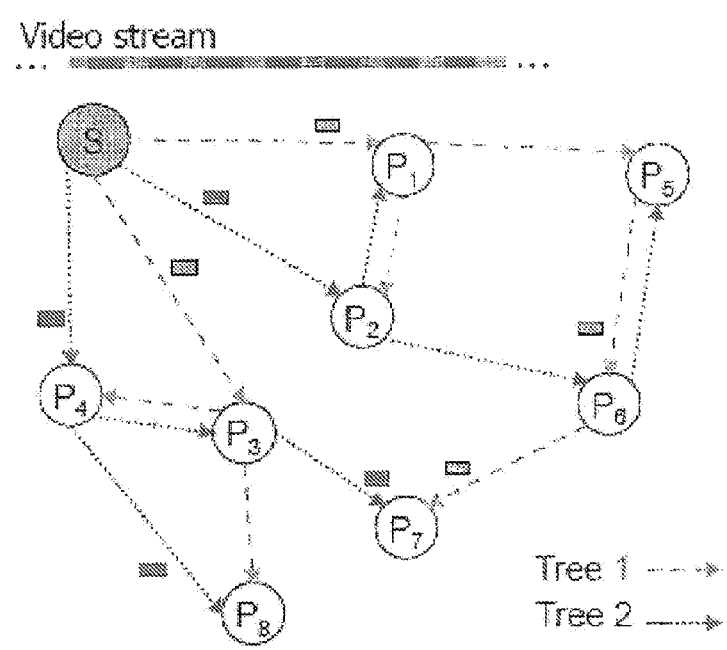
FIG. 10 depicts a schematic diagram of a tree structure for organizing the network system depicted in FIG. 1.

As depicted in FIG. 10, in system 100, network nodes are organized in an overlay of multiple complementary trees. Every tree is rooted at the video source. The media stream, originating from the video source, is packetized and distributed on different trees such that there are no duplicate packets across the trees. Peers subscribe to every tree in order to receive the media stream contiguously. For live video streaming, system 100 focuses on low-latency and cross-layer optimized video transport. Live contents are disseminated to each node via multiple complementary multicast trees explicitly built among the peers. The degradation of video quality due to peer churn and network packet loss is alleviated by network-aware and video-aware packet handling algorithms. The video source can include raw video data or previously encoded video data such as H.264 or MPEG data.

FIG. 10 illustrates an exemplary embodiment in which two complementary trees are constructed among a small group of peers. Typically, 4 to 8 trees are generated in the system.

The tree structure depicted in FIG. 10 is merely an exemplary embodiment. The embodiments described herein are suitable for a system with or without using the tree structure.

As peers join the system, the trees are incrementally constructed in a distributed manner. In one embodiment, when a new peer contacts the video source, the video source replies with session information, such as the number of multicast trees and the video bit rate. It also sends a list of candidate parents randomly chosen from the table of participating peers it maintains. The new peer then probes each candidate parent to know about their current status. After receiving probe replies, the best candidate parent is selected and contacted for each tree by minimizing the height of the distribution tree. Once the selected candidate parent accepts the attachment request, a data connection is established between the parent and the new peer. After data transmission starts, each child peer periodically sends "Hello" messages to their parents. When a peer leaves the system ungracefully, its parents detect it by observing consecutive missing hello messages, and stop forwarding video to the child. The departing peer's children notice that neither video packets nor a response to hello messages arrive. Each abandoned child then initiates a method to continuously provide uninterrupted video service in accordance with the embodiments described herein.

Figure 7:
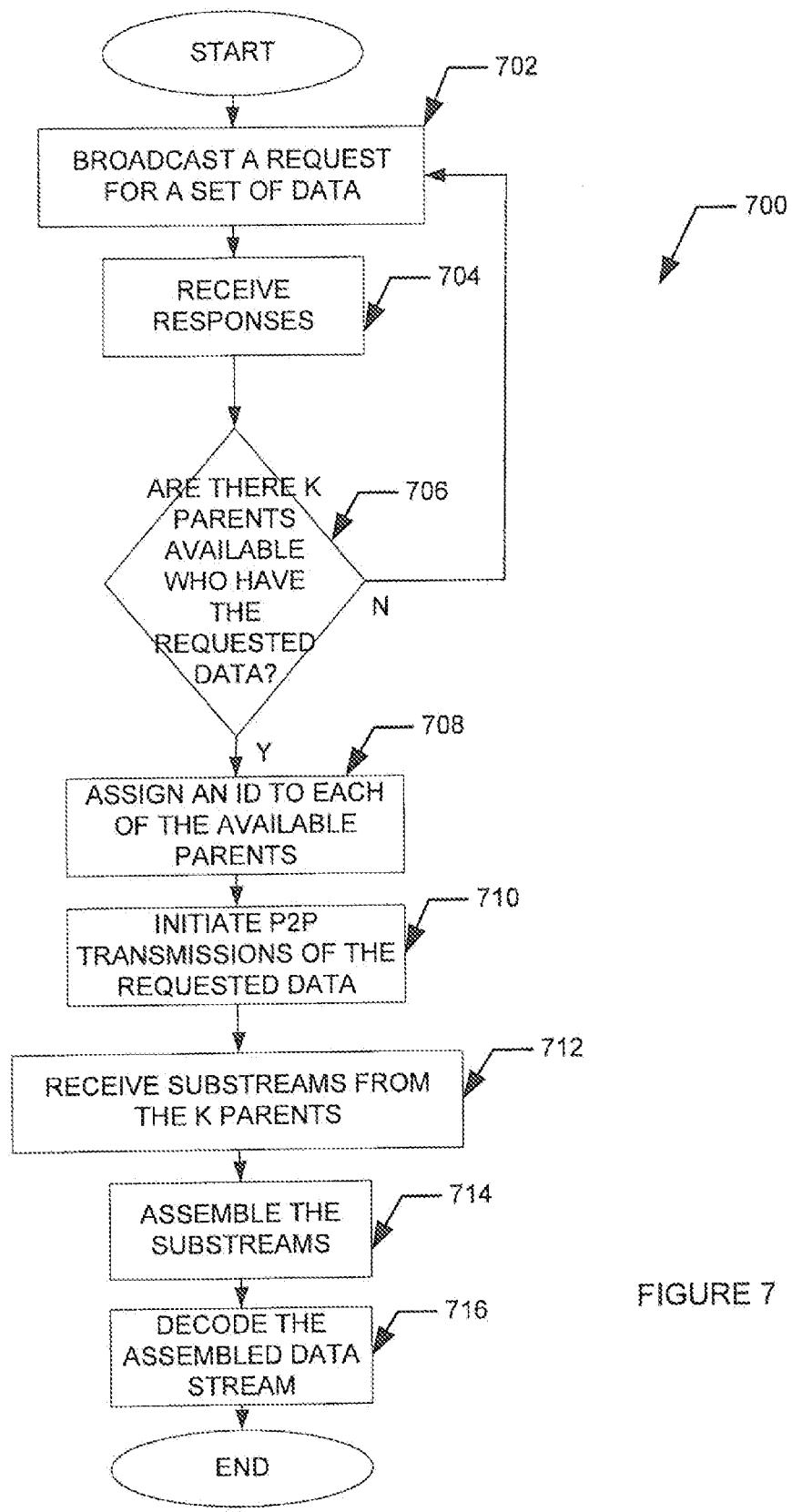
FIG. 7 depicts a method according to one embodiment for streaming video data from a plurality of parent nodes to a mobile device.

In another embodiment of method 700 as depicted in FIG. 7, to provide the video data to a child in system 100, the child first broadcasts a request for the data and/or resource which it is seeking (702). Upon receiving the responses form other network nodes within the system (704), the child examines the responses and determines if there are available a predetermined number (K) of parents who have the request data/resources (706). The parents can also be determined in accordance with other criteria, such as whether a complete copy of the request data is available, or the processing power of the fixed node, etc.

If there are less than K parents available, the child then proceeds back to 704 or wait for a certain time period before proceeding back to 704. Alternatively, the child can reduce the number K and proceed to 708 or back to 704.

Upon determining that there are K parents within the system who have the request data and/or meet other criteria, the child then assigns an ID to each of the available parents 708). At 710, the child initiates a P2P transmission of the requested data from the parents. The requested data are transmitted in the form of a plurality of substreams. At 712 and 714, the child receives the substreams and assembles the substreams into a final data stream. If the data stream is encoded, at 716, the final data stream is decoded for local display. The P2P transmissions and the handling of incomplete data in case of missing substreams and/or packets are further detailed hereinafter.

In particular, system 100 allows fixed nodes to perform transcoding for their children. After a network node connects to multiple fixed nodes as its parents, each parent generates a substream by transcoding the original video. These substreams are transmitted and then assembled at the child as if they were a single stream. If the child loses some of its parents, it still receives substreams from the other parents and decodes the incoming video partially with graceful degradation. In addition, the method distributes transcoding overhead to multiple fixed nodes. The distributed transcoding method can conforms to the H.264/AVC baseline profile or other coding standards. This allows any standard decoders to decode the video data provided by system 100.

In a further embodiment, fixed nodes are peers that receive and consume the original video emanating from a video source. Mobile nodes are peers that cannot receive the original video due to limited downlink bandwidth, or/and cannot consume the original video due to limited video decoding capabilities.

In system 100, fixed nodes are peers that receive and consume the original video emanating from a video source. Mobile nodes are peers that cannot receive the original video due to limited downlink bandwidth, or/and cannot consume the original video due to limited video decoding capabilities. Accordingly, fixed nodes perform transcoding to adapt the original video according to the individual requirements of each mobile node.

Figure 4:
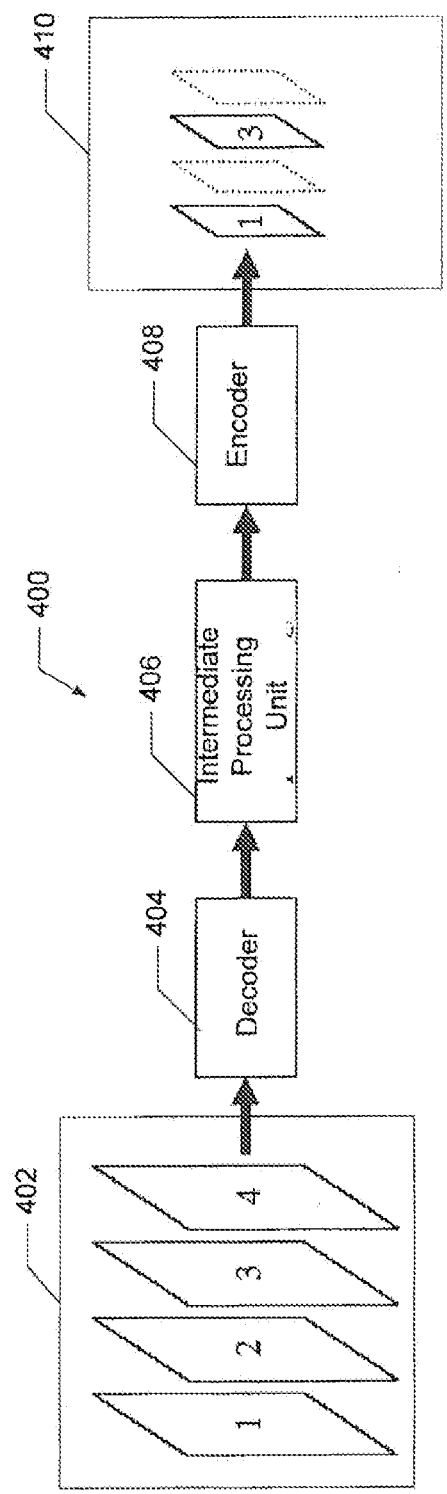
FIG. 4 depicts a schematic diagram of a transcoder according to a further embodiment of the invention.

In one embodiment, the transcoder 353 in the parent employs a cascaded transcoding scheme 400 shown in FIG. 4, including a decoder 404, an intermediate processing unit 406, and an encoder 408. In this embodiment, an original video stream 402 flows into the decoding unit 404. The intermediate processing unit 406 transforms the decoded stream by performing frame rate conversion, downsampling, cropping, or any other preprocessing before encoding. The output of the encoder 408 is the transcoded bitstream. If the original video stream 402 include raw video data, the decode 404 can be omitted.

When a mobile node joins the system 100, it searches for K fixed nodes that have available up-link bandwidth and processing power. In general, the number of fixed nodes exceeds K. The number K can be adjusted to suit the system scale. After the mobile user finds K fixed nodes as parents, it assigns them unique Parent IDs (from 1 to K). Then, it requests them to trancode disjoint sets of video frames (substreams). For the synchronization of substreams, parents add meta-data to substreams, such as the time stamp of a GOP. During the parent-coordination process, the mobile node examines its device-specific profile, such as the media decoding capability, display size, and user's preference. It also detects time-varying parameters including the remaining battery capacity and the maximum downlink bandwidth of the wireless channel. Based on the collected information, the mobile node determines the video quality (e.g., quantization parameter), frame rate, and spatial resolution. Each parent transcodes the original video to the substream associated with its Parent ID. When a fixed node serving as a parent leaves the system, its child node finds a different fixed node to recover the missing substream. When Parent 1 failure is detected, the mobile node selects one of its available parents as the new Parent 1. When I frames are lost due to the lossy channel, retransmission is requested for the missing I frames. To avoid self-congestion, retransmissions of P frames are not requested.

Alternatively, in order to balance the transmission bitrate, parents may transmit I-frames to the mobile receiver in a round robin. Still alternatively, any one of parents 1-K that has sufficient uplink bandwidth may be dedicated for transmitting I-frames.

Interleaved Distributed Transcoding

As depicted in FIGS. 1 and 10, in system 100, a peer has multiple peers as parents. When a parent disappears or becomes unavailable, only a subset of video packets are lost. System 100 allows for graceful video degradation in this situation. In particular, system 100 allows multiple fixed nodes to perform transcoding for a mobile device. A mobile node selects multiple fixed nodes as its parents and the parents perform transcoding collaboratively.

Figure 5:
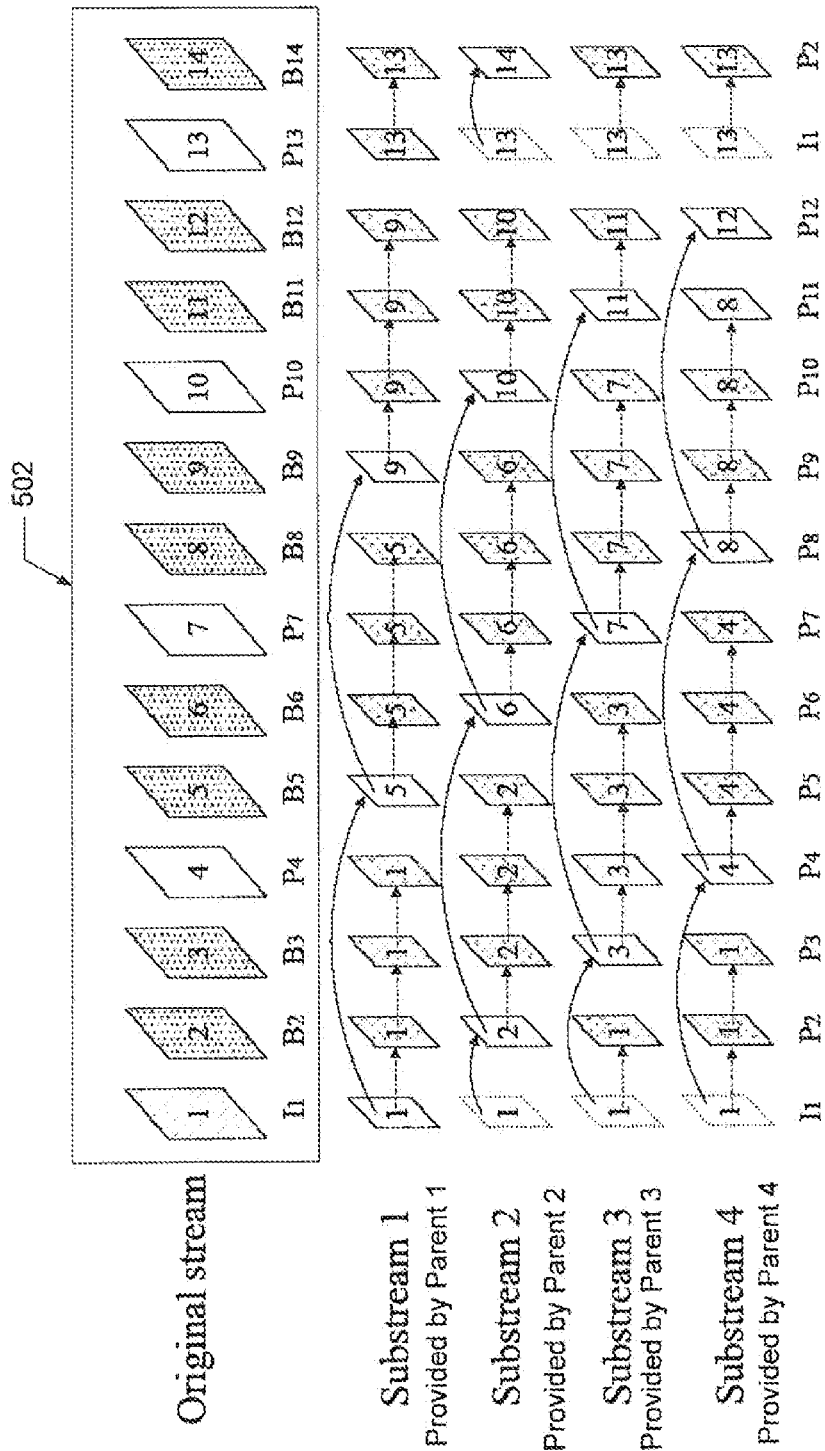
FIG. 5 depicts a transcoding scheme for generating four substreams from an original video data stream.

Unlike conventional schemes where each parent transcodes the entire original video and delivers a disjoint substream of it to a mobile node, which needlessly wastes computing power at the parents, in order to reduce processing redundancy, yet achieve robustness with multiple parents, an interleaved distributed transcoding (IDT) method is provided. FIG. 5 depicts an exemplary embodiment of the IDT method. According to this embodiment, K (e.g., K=4) parents are generating transcoded substreams with a Group of Pictures (GOP) of N (e.g., N=12) frames. The size of original GOP 502 is assumed to be larger than 14. This illustration demonstrates that the GOP size of the transcoded stream can be selected independently of the one of the original stream.

In transcoding, each parent is assigned a ID which uniquely identifies the parent within this group of parents. The ID of a parent is associated with its order within the group. Alternatively, the parents are ordered from 1 to 4 and each assigned a corresponding number (i.e., parents 1-4).

At each parent, the original video frames are first decoded. The decoded bitstream is downsampled to smaller frames in the spatial domain. The first frame in GOP 502 is coded as an I-frame, and each following frame is coded as a P-frame predicted from the frame immediately preceding it in the substream. Parent i (i=1, 2, 3, or 4) codes Substream i, which includes Frame i, K+i, 2K+i, . . . , and each parent transmits every Kth frame in a disjoint manner. The I-frames are encoded and used in prediction by all parents, yet transmitted by only Parent 1 to avoid duplicate transmission. In some other embodiments, B frames can also be employed within each substream to achieve higher coding gains.

As further depicted in FIG. 5, the original video stream is utilized to generate K substreams by K parents. The first frame of a GOP is encoded as an I-frame by all parents. To avoid duplicate transmission, only Parent 1 transmits the I-frames. The original stream is pre-processed before encoding, such as downsampling or frame rate adjustment. Within each substream, the frame which is not encoded from the original stream is replaced with a copy of the previous coded frame. For example, in substream 1, after the first frame is coded as an I-frame (i.e., frame 1), a copy of the encoded I-frame is used to substitute each of the following three frames that are not coded by parent 1. In substream 2, after frame 2 is coded based on frame B2 and the prediction from the I-frame, a copy of frame 2 is used to substitute each of the following three frames that are not coded by parent 2. Note that a copy of the previous frame can be efficiently encoded in the resulting bit stream, requiring only a small number of bits. The operations of parents 3 and 4 are performed similarly.

Figure 9:
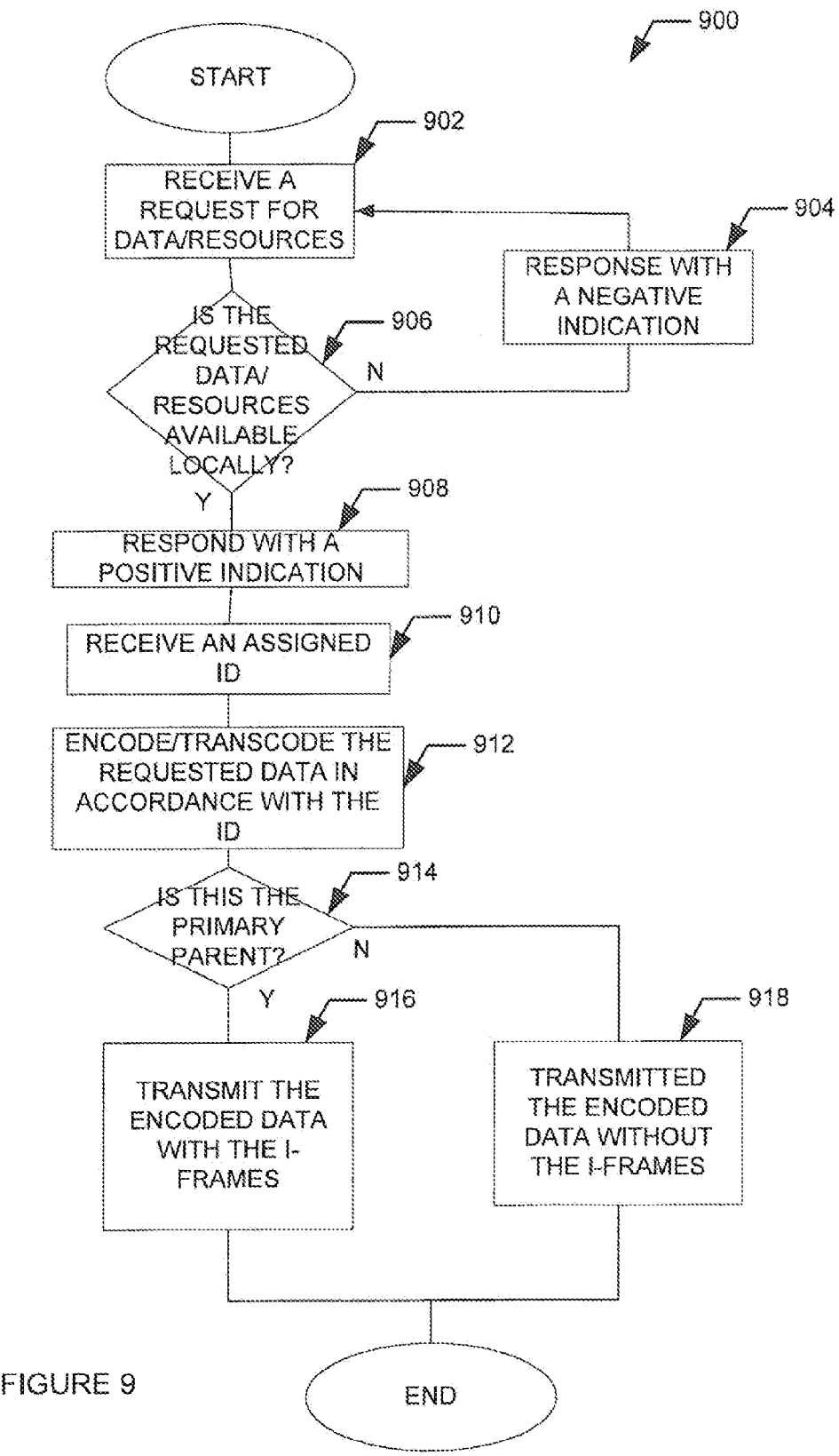
FIG. 9 depicts a method according to another embodiment for encoding and transmitting a video data stream at a parent node.

FIG. 9 depicts another embodiment of a data coding method for providing data streaming in a P2P system. Method 900 can be implemented on network devices 107-109 which make their data/resources available for other devices in system 100. According to method 900, when a network device receives a request for certain data or resources (902), it examines its own memory, status, and resource to determine if it has the data/resources that are being requested by another device (906). If it does not, it then responds with a negative message (904) or simply ignores the request. If it has the requested data/resources, this device then responds to the request with a positive message (908).

If the device requesting the data/resources selects this device as one of the parents as described above, an ID or a number is assigned to this device (910). At 912, this device then starts an encoding process to generate the encoded bitstream in accordance with the assigned ID or the number. The encoding process is described above with the reference to FIG. 5.

This distributed transcoding scheme achieves robustness against peer churn and distributes transcoding workload among multiple fixed nodes. The incurred cost is the redundancy in the transcoding bitstream due to lower temporal correlation between video frames.

Implementing IDT in H.264/AVC Framework

In one embodiment, the interleaved distributed transcoding (IDT) method does not require any decoder modification. The IDT generates no B-frames and utilizes multiple reference frames for encoding P-frames. This ensures that any decoder conforming to the H.264/AVC baseline profile can decode transcoded bitstreams. Suppose that K parents are involved in transcoding. The IDT encoders at the parents encode the first frame in a GOP as an I frame, which is identical across all the encoders. The remaining frames in a GOP are encoded as P frames. To encode Frame n as a P-frame, Frame n-K, the previously encoded frame in the same substream, is used as a reference frame for motion-compensated prediction. Therefore, the IDT encoder is required to store K previously encoded frames. To this end, the multiple reference picture motion compensation specified in the H.264/AVC baseline profile can be used. It allows the short-term reference picture buffer to hold multiple reference pictures, e.g., K previously encoded frames.

In addition, the reference picture reordering specified in the H.264/AVC baseline profile can be employed to ensure the correct frames are used as a reference picture for motion prediction. The H.264/AVC standard provides the SKIP mode, in which the current macroblock (MB) is a copy of the same MB in the previous frame with a motion vector that is the median of the motion vectors in the neighboring MBs. For the SKIP mode, the most recent frame in the reference picture buffer is always used as a reference. To allow the SKIP mode to work correctly, we move the previous frame in a substream to the front of the picture buffer by reference picture reordering. The encoder uses only the most recent frame although there may be up to K pictures available in the buffer.

Figure 6A:
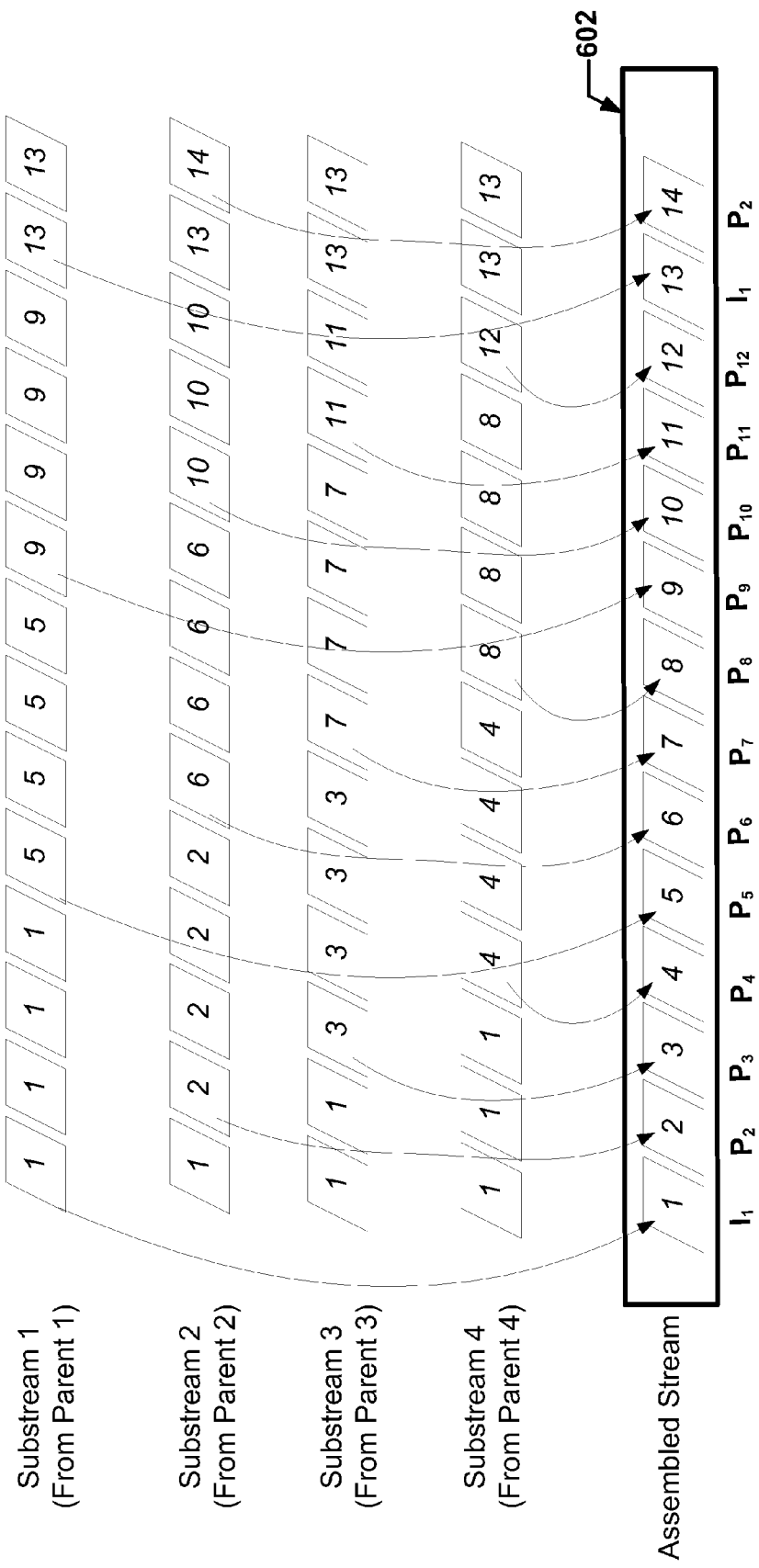
FIG. 6A depicts an assembling and decoding process where every transcoded video frame is received at the mobile device.

When the IDT encoder encodes every Kth frame, the remaining frames are encoded as an exact copy of the previously encoded frame. In FIG. 6A, the IDT encoder at Parent 1 encodes Frames P2, P3 and P4 as a copy of Frame 1. Frame copy encodes frames with negligible computational complexity at the cost of about 1-2% of control bits added to the transcoded video. Frame copy not only avoids encoding unnecessary frames, but also embeds control bits for error concealment in the bitstream. This allows error concealment to be done at the bitstream level.

Receiving and Decoding Transcoded Video

Figure 6B:
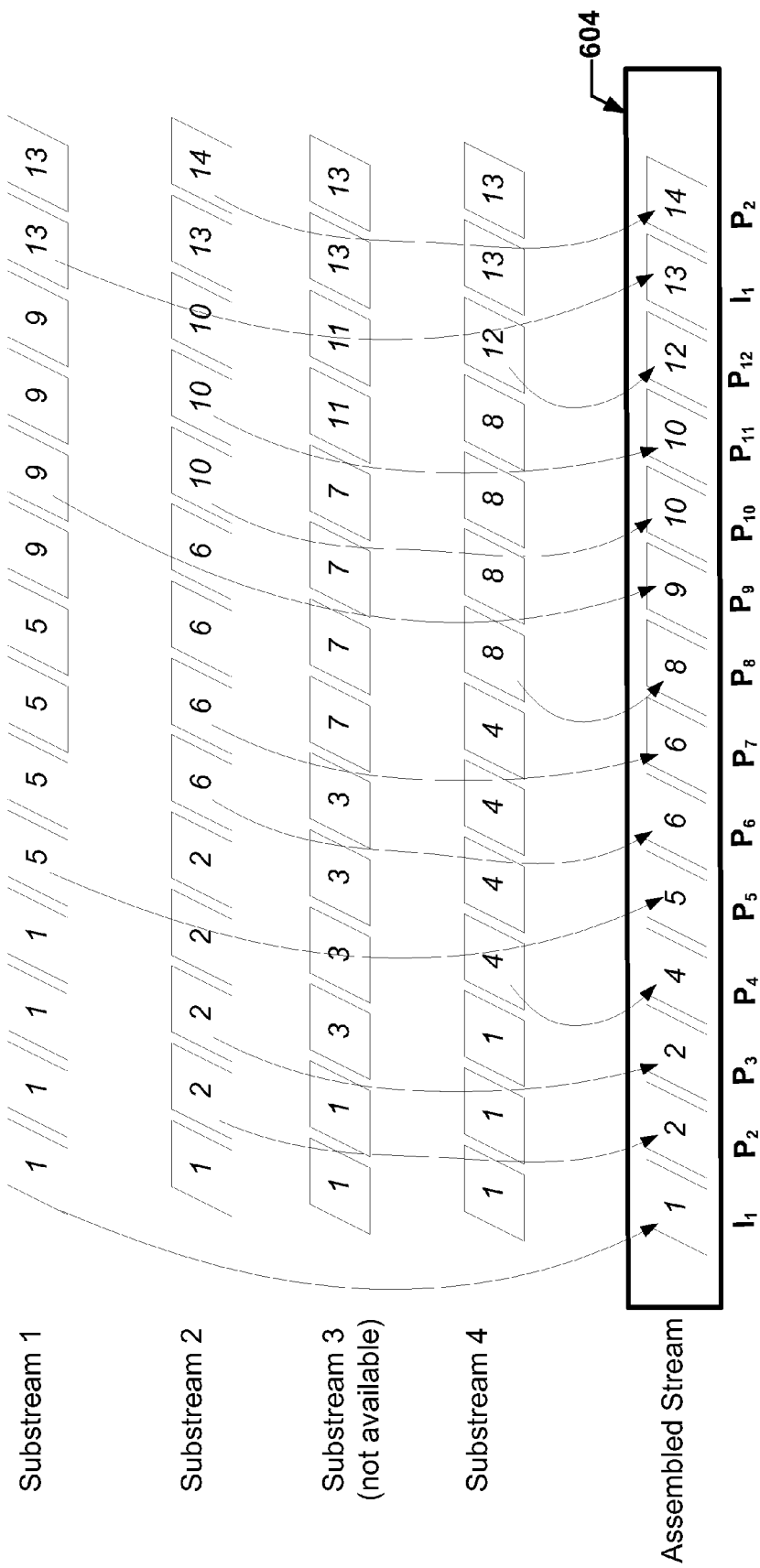
FIG. 6B depicts an assembling and decoding process where one of the substreams becomes unavailable to the mobile device.

As substreams generated by multiple parents are transmitted to the destination child (e.g., mobile devices 102-105), the child starts an assembling and decoding process as depicted in FIGS. 6A and 6B.

When there are no lost frames and every parent is available as depicted in FIG. 6A, the assembling process of the child executed in the P2P streaming module 248 or 354 takes frames from each substream according to their interleaving order and places them in the final data stream 602. In particular, the child interleaves frames according to their positions in the GOP structure. As the substreams are interleaved, the frame copy bits contained in the other substreams are discarded for frames that are successfully received. For example, the frames 1, 5, 9 and 13 are taken from substream 1 and used as frames 1, 5, 9, 13 in the final data stream. In general, frames i+(n−1)*K are extracted from substream i and used as frame n in the final data stream. Other frames that are not used in the final data stream are then discarded. The assembled bitstream 602 is then passed to the decoder for playback.

When there are lost frames or one or more parents become unavailable so that the entire substream is missing, the corresponding substream becomes unavailable at the mobile node. In general, for the frames of the missing substream, the frame copy bits from the available substream preceding the missing substream are used as a replacement. However, if Parent 1 becomes unavailable, then the child requests the missing I frames from one of the remaining parents or other network nodes in system 100.

FIG. 6B depicts one example, where parent 3 disconnects and substream 3 becomes unavailable. Therefore, frames 3, 7, and 11 become unavailable to the child. In assembling the final data stream, the frame copies (frames 2, 6, and 10) in substream 2, which correspond to frames 3, 7, and 11 in the missing substream (i.e., substream 3), are used as frames 3, 7, and 11 in the final data stream 604. Alternatively, the frame copies from other substreams (e.g., substream 1 or 4) can also be used to substitute the missing frames in final data stream 604.

Figure 8A:
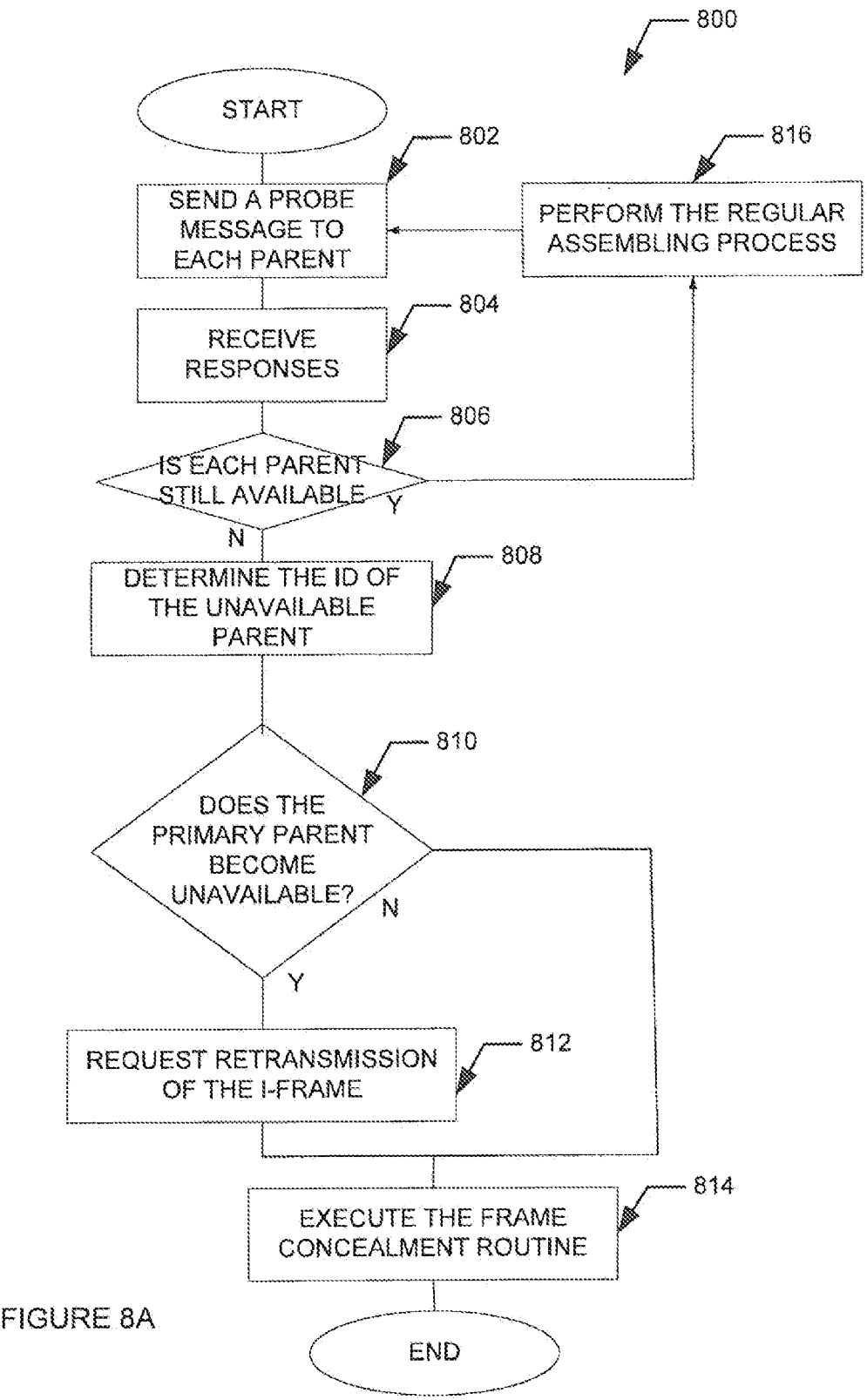
FIG. 8A depicts a method according to one embodiment for recovering the a video stream from received substreams when a parent node becomes unavailable.

FIG. 6A (in conjunction with FIG. 8A) depicts one embodiment of an assembling and decoding process 800 executed by a child upon receiving the incoming substreams from the parents. This process can be executed by one or more of the P2P streaming modules 248 and 354, decoders 247 and 353, and decoder 261. In this embodiment, the child periodically sends or broadcasts a probe message (e.g., a "Hello" message) to each of the parents (802). Upon receiving the response, the child determines if all of the parents are available (806). If yes, the child performs the regular assembling process as depicted in FIG. 6A (816). If at least one of the parent is unavailable (e.g., no response from that parent is received), the child determines the ID of the unavailable parents (808). At step 810, the child determines if the unavailable is the primary parent (e.g., Parent 1 in FIG. 6A), if no, the child executes the frame concealment routine as depicted in FIG. 6B (814). If yes, the child then requests retransmission of the I-frames from existing parents or other devices in the system (812). Alternatively, the child can also select one of the existing parents or other network devices as the primary parent and then requests retransmission of the missing I-frames or the entire missing GOP. When a retransmission request for missing I-frames fails (e.g., time-outs), the affected GOP may be entirely dropped and frame freeze on the display may occur.

As mentioned earlier, frame copy control bits are independent of video contents and it is possible to reconstruct them at a decoder in the H.264/AVC standard. When additional processing is acceptable and reduction in transmission bitrate is desirable, frame copy control bits can be completely removed from substreams at parents, which can achieve a 1-3% reduction in the bitrate, depending on video content and spatial/temporal resolution. In this case, the substream assembler at the mobile receiver reconstructs frame copy control bits according to the location of a missing frame in the GOP structure. The reconstructed bits are then added to the assembled bitstream, which will be decompressed at the decoder.

Figure 8B:
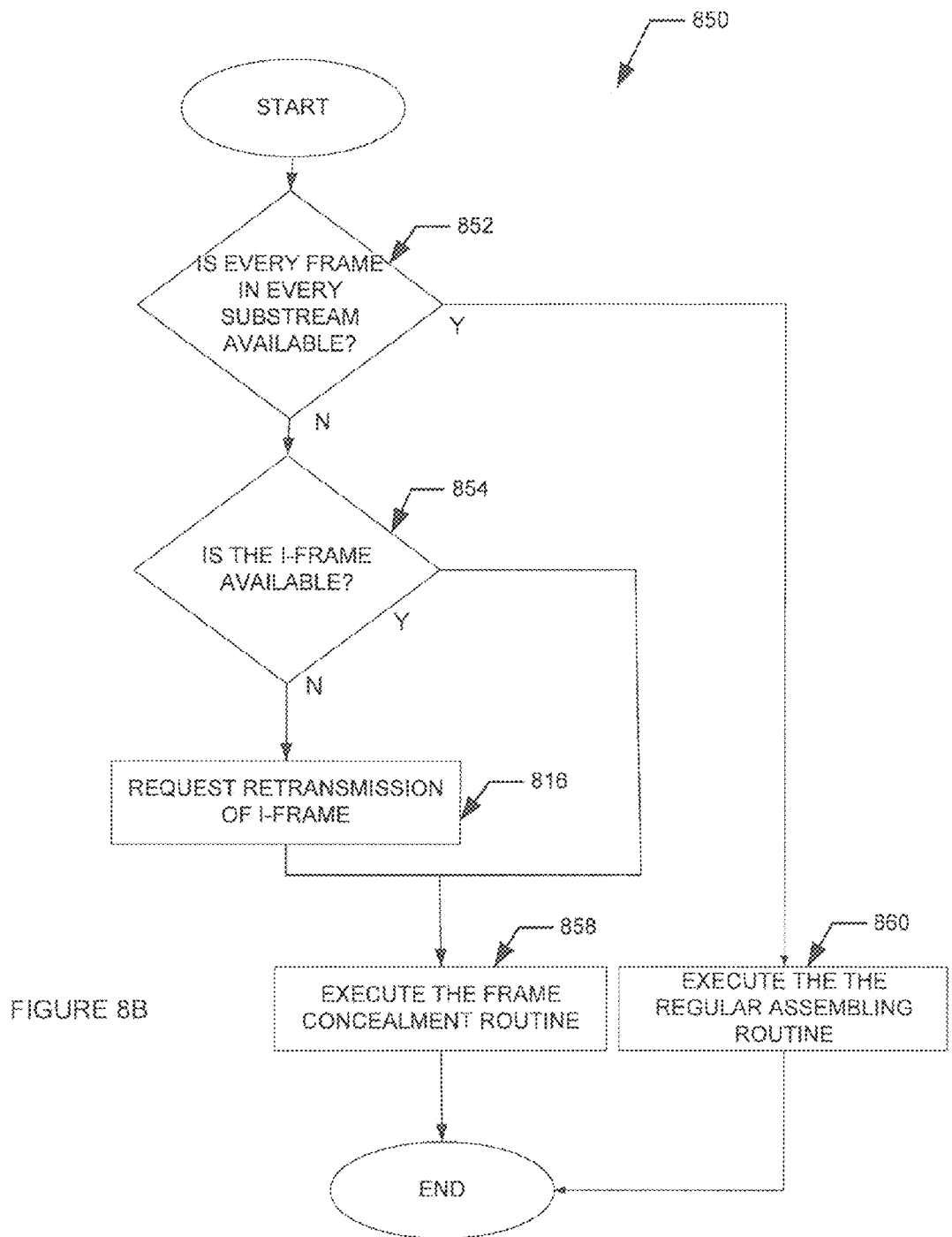
FIG. 8B depicts a method according to another embodiment for recovering a frame stream from received substreams when individual frames are unavailable.

FIG. 6B, in conjunction with FIG. 8B, depicts another embodiment of the assembling process. According to process 850, the child first examines if every frame in every substream is available (852). If yes, the child executes the regular assembling process as depicted in FIG. 6A (860). If there is one or more missing frames, the child then determines if the missing frame is an I-frame (854). If it is a missing I-frame, the child requests retransmission of the I-frame from other parents or other network devices (812) and executes the frame concealment routine depicted in FIG. 6B (858).

Note that the redundancy of frame copy bits in multiple substreams allows the assembled bitstream to be correctly played back even when more than one bitstream is missing. Since the assembly of substreams and the selective insertion of frame copy bits are performed at the bitstream level, no modification to the standard decoder is necessary in the child.

Applications

The invention can be implemented in a peer-to-peer (P2P) system, where peers are regular user end systems, such as personal computers, mobile devices (laptops, PDAs), home entertainment systems, or set-top-boxes. The proposed algorithm, distributed video transcoding, allows peers to contribute their processing power for adapting (transcoding) video to a common mobile client, thus lowering processing (transcoding) load at each individual peer. The algorithm also achieves robustness by allowing the mobile client to play back the video as long as it receives a fraction of the transcoded video bitstream. The outputs of the peers adapting the video for the common mobile user are assembled at the mobile user's client (e.g., software running on the user's mobile device). Although some peers may disappear without prior notice and the corresponding substreams may be missing, the mobile client can still play the video with graceful quality degradation because the dependency between the outputs from the peers is greatly reduced by the algorithm.

The invention can also be applied to diverse distributed systems in addition to peer-to-peer systems. Since it offers robustness to video streaming, the proposed algorithm can be applied to legacy media servers. By executing the data streaming method at multiple media devices, mobile users can enjoy the streaming service without interruption because it is very unlikely to have all the parents fail or suffer from the processing/streaming overload.

The invention can also be applied to a single-server case. Specifically, the single server can generate multiple substreams from the original video stream and transmits the substream independently as if they are transmitted from multiple devices. The substreams are similar to those depicted in FIGS. 6A and 6B. Since the dependency between packets is reduced, the output streams generated by the proposed transcoder are robust to packet losses/jitter in the network, especially over the wireless channel.

Variations

The method and system client can be in the system having any type of devices, such as personal computers, set top boxes, whether connected to the network using either wireless channel or wired line. In addition to P2P network, the method and system depicted here can be implemented in non-P2P network or any type of distributed systems.

The method described here can be implemented in C/C++ or any other programming language on any general purpose or proprietary computer systems. The encoding method can be implemented by extending the open sources MPEG and x264 encoder. Any typical H.264 baseline decoder and video player as the wrapper can be combined with the interleaving routine for decoding at the (mobile) receiver. Various method described here can be implemented on the Mac OS X, Linux, Windows, Symbian, or any other operating systems.

While the invention has been particularly shown and described with reference to preferred embodiments thereof, it will be understood by those skilled in the art that various changes in form and details may be made therein without departing from the spirit and scope of the invention.

The invention claimed is:

1. A method for streaming video data within a network, wherein the video data includes a sequence of frames, the method comprising:
   encoding, at a plurality of parent devices, the sequence of frames;
   generating, at each of the plurality of parent devices, a substream from the encoded frames, wherein each substream is assigned an identifier, and wherein each substream includes a common encoded frame and a portion of the encoded sequence that does not overlap with other substreams of the plurality of parent devices; and
   transmitting the plurality of substreams to a receiver, wherein the common encoded frame is transmitted to the receiver by a parent device designated as a primary parent device, and wherein in the event that the primary parent device becomes unavailable, the common encoded frame is transmitted to the receiver by a parent device other than the primary parent device.

2. The method of claim 1, wherein the plurality of parent devices receive the sequence of frames from a single network entity within the network.

3. The method of claim 1, further comprising:
   ordering each substream of the plurality of substreams;
   assigning the identifier of each substream based on the order of the respective substream within the plurality of substreams; and
   selecting for each substream the non-overlapping portion from frame positions within the sequence of encoded frames corresponding to the order of the respective substream.

4. The method of claim 1, further comprising encoding the sequence of frame based on a H.264/AVC encoding scheme.

5. The method of claim 1, further comprising receiving a request for retransmitting the common encoded frame in the event that the primary parent device becomes unavailable.

6. A method for providing video data including a sequence of frames, comprising:
   receiving a plurality of encoded substreams, wherein each encoded substream includes a common encoded frame and at least a non-overlapping portion of the sequence of frames and wherein each encoded substream is assigned an identifier;
   recovering the sequence of frames by assembling the plurality of substreams;
   determining that at least one frame is missing in one of the plurality of substreams in the non-overlapping portion; and
   selecting a replacement frame from the non-overlapping portion of another substream so as to replace the at least one missing frame, wherein the replacement frame is selected in accordance with the identifier of the substream in which the at least one frame is missing.

7. The method of claim 6, further comprising decoding the sequence of recovered frames.

8. The method of claim 6, wherein recovering the sequence of frames by assembling the plurality of substreams further comprising:
   selecting at least one frame from the non-overlapping portion of each substream; and
   placing the selected at least one frame in the sequence of recovered frames in according to the identifier of respective substream.

9. The method of claim 6, further comprising:
   detecting one of the plurality of substreams is missing; and
   selecting another one of the plurality of substream so as to substitute the selected substream for the missing substream based on the identifier of the missing substream.

10. A system for streaming video data in a network, wherein the video data include a sequence of frames, the system comprising:
    one or more parent devices configured to generate a plurality of substreams from the sequence of frames, wherein each substream includes a common encoded frame and at least a non-overlapping portion of the sequence of frames and wherein each substream is assigned an identifier, the one or more parent devices further configured to transmit the plurality of substreams in response to a request; and
    a receiver configured to request the video data from the one or more parent devices, receive the plurality of substreams, and recover the sequence of frames by assembling the plurality of substreams, wherein the receiver is further configured to select at least one frame from the non-overlapping portion of each substream and place the at least one selected frame in the sequence of recovered frame based on the identifier of the respective substream.

11. The system of claim 10, wherein each of the one or more parent devices is configured to generate and transmit a respective substream, and wherein each parent device is assigned the identifier of the respective substream.

12. The system of claim 10, wherein each of the one or more parent devices is further configured insert a temp stamp into each substream.

13. The system of claim 10, wherein the receiver is configured to detect at least one of the plurality of substreams is missing, select one other substream based on the identifier of the missing substream, and substitute the selected one other substream for the missing substream.

* * * * *